(No Model.)
J. B. SCHNEIDER.
Dinner Bucket.
No. 240,552. Patented April 26, 1881.
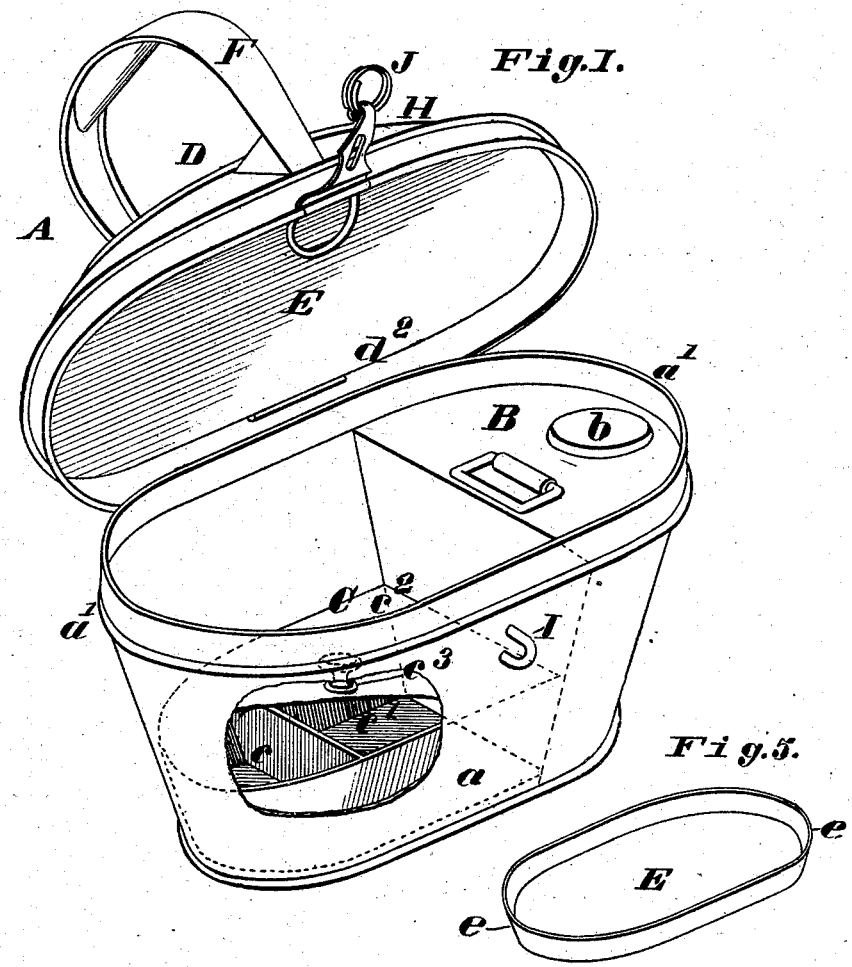
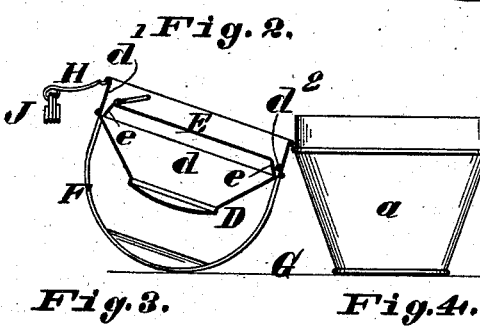
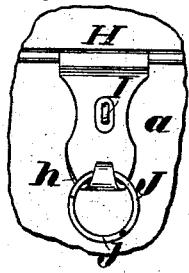 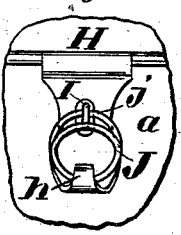
Attest:
Charles Pickles
Saml. S. Boyd
Inventor:
John B. Schneider
by C. D. Moody
atty.

United States Patent Office.

JOHN B. SCHNEIDER, OF ST. JACOBS, ILLINOIS.

DINNER-BUCKET.

SPECIFICATION forming part of Letters Patent No. 240,552, dated April 26, 1881.

Application filed March 3, 1881. (No model.)

*To all whom it may concern:*

Be it known that I, JOHN B. SCHNEIDER, of St. Jacobs, Madison county, Illinois, have made a new and useful Improvement in Dinner-Buckets, of which the following is a full, clear, and exact description, reference being had to the annexed drawings, making part of this specification, in which—

Figure 1 is a view, in perspective, of the improved bucket, the cover being raised and the wall of the bucket being broken away to exhibit the interior construction; Fig. 2, an end elevation, the cover being in section and turned back, so that the handle encounters the surface upon which the bucket is resting and in that position serving to uphold the cover; Figs. 3 and 4, details, being front elevations of the hasp, and, respectively, as unlocked and locked; Fig. 5, a view, in perspective, of the dish used in closing the chamber in the bucket-cover; and Fig. 6, an edge view of the hasp and locking ring.

The same letters denote the same parts.

The present invention relates to the body of the bucket and the vessels therein contained, to the cover and means used in inclosing the chamber therein, and the means used in locking the hasp.

In the drawings, A represents the improved bucket. The body $a$ tapers downward, and at its ends $a'$ $a'$ is preferably rounded, as shown. In one end of the body is a vessel, B, suitable for holding fluids, such as coffee, and which are introduced into and discharged from the vessel at the (covered) opening at $b$. In the other end of the body is a box, C, having one or more compartments, $c$ $c'$, suitable for holding articles of food, such as meat and preserves. The box has a lid, $c^2$, to which is a handle, $c^3$. The vessel B and box C are detachable from the bucket, and when in place they abut against each other, and at their outer ends are made to fit the tapering wall of the bucket, and they occupy the entire length and breadth of the body. The vessel B is preferably made as deep as the body $a$ will contain. The box C is shallower, leaving a space above it which can be used for holding such things as bread or napkins.

The cover D is crowned, as shown more distinctly in cross-section in Fig. 2. The chamber $d$ thus created in the cover is made to be inclosed by a part, E, Figs. 1, 2, and 5, which is in the form of a dish having a flange, $e$, which serves to form the side wall of the dish when used as such, and also to hold it in place in the cover by springing the flange $e$, which is flexible, into the flange $d'$ of the cover; and, to better hold the part E in place, the cover may be provided with projections $d^2$, against which the flange $e$ may bear, as shown.

The chamber $d$ may be used for holding articles that can be carried safely either side upward, and which are held in the cover by means of the part E. The latter may, when withdrawn from the cover, be arranged as in Fig. 5, and made to serve as a dish.

The handle F of the bucket is rigidly attached to the cover D, in order that when the cover is turned over and back upon its hinge the handle, resting upon the supporting-surface G, shall serve as a reliable support in upholding the cover, as shown in Fig. 2.

To hold the cover D to the body $a$ the cover is furnished with a hasp, H, which is perforated to pass over the eye I in the usual manner. To lock the hasp the latter is furnished with a split ring, $j$, which is pointed to the lower end, $h$, of the hasp. To unlock the hasp the ring is turned down, as in Fig. 3, and to lock it the ring is turned, in the end $h$, upward, and the end $j$ passed through the eye I, as shown in Figs. 4 and 6. To enable the ring to be readily attached to the hasp and to readily operate the ring, the end $h$ of the hasp is narrowed and wrapped around the ring.

By reason of the tapering form of the body $a$ of the bucket, and of the outer ends of the vessel B and box C, the latter can be readily and securely placed and held in the bucket.

I claim—

1. The dinner-bucket A, having the tapering body $a$ and the vessel B and box C, substantially as described.

2. A dinner-bucket having an inclosed chamber, $d$, in its cover, substantially as described.

3. The combination of the crowned cover D and the dish E, substantially as described.

4. A dinner-bucket having a chamber in its cover which is inclosed by a removable dish, E, substantially as described.

5. The combination of the bucket A, hasp H, eye I, and split ring J, substantially as described.

6. The combination of the eye I, split ring J, and the hasp H, having its end $h$ tapered and wrapped around the ring J, substantially as described.

JOHN B. SCHNEIDER.

Witnesses:
JOHN SCHÄFER,
JAN. C. STEINKÖNIG.